June 21, 1966 K. L. TATE ET AL 3,256,740
PRESSURE RESPONSIVE DEVICE
Filed Sept. 27, 1961 4 Sheets-Sheet 1

INVENTORS
Kenneth L. Tate
Howard R. Jaquith
Harold S. Hopkins
Nathaniel B. Nichols BY P. J. Young, Jr.

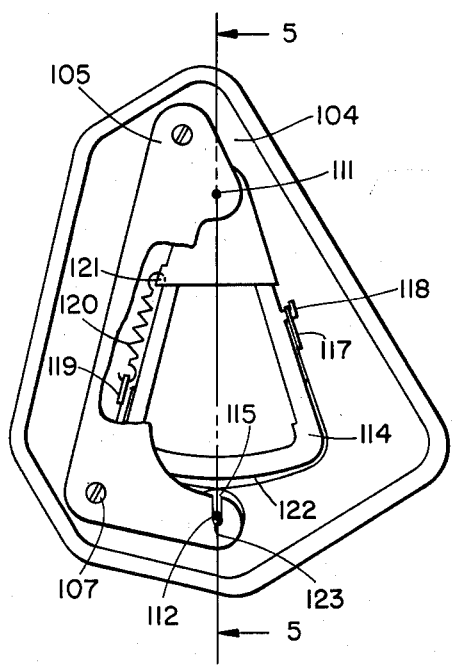
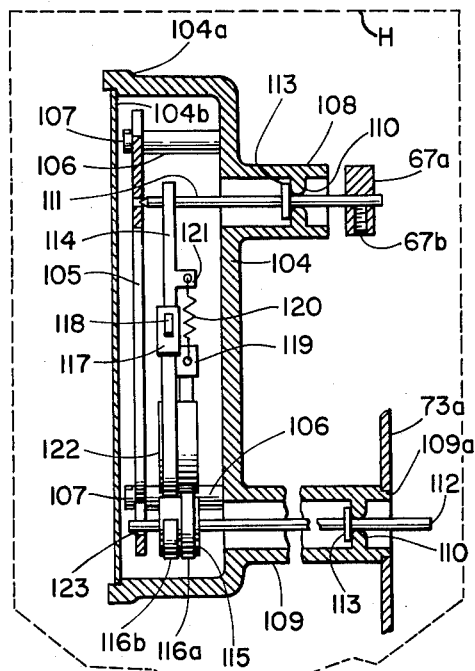
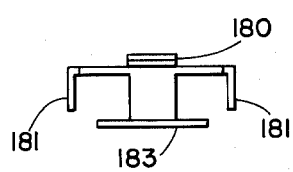
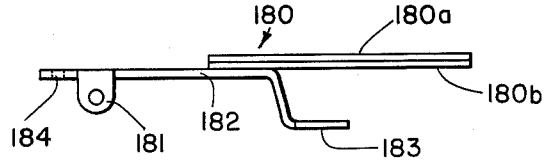
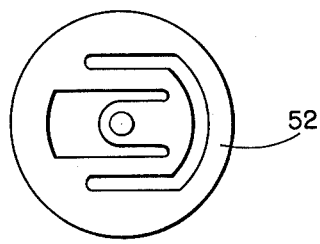
INVENTORS
Kenneth L. Tate
Howard R. Jaquith
Harold S. Hopkins
Nathaniel B. Nichols INVENTORS
Kenneth L. Tate
Howard R. Jaquith
Harold S. Hopkins
Nathaniel B. Nichols June 21, 1966     K. L. TATE ET AL     3,256,740
PRESSURE RESPONSIVE DEVICE Filed Sept. 27, 1961     4 Sheets-Sheet 4

INVENTORS
Kenneth L. Tate
Howard R. Jaquith
Harold S. Hopkins
Nathaniel B. Nichols BY P. J. Young, Jr.

United States Patent Office
3,256,740
Patented June 21, 1966

3,256,740
PRESSURE RESPONSIVE DEVICE
Kenneth L. Tate, Howard R. Jaquith, Harold S. Hopkins, and Nathaniel B. Nichols, Rochester, N.Y., assignors to Taylor Instrument Companies, Rochester, N.Y., a corporation of New York
Filed Sept. 27, 1961, Ser. No. 141,127
19 Claims. (Cl. 73—388)

This invention relates to servo-relays and use thereof in the arts of measuring, controlling and the like. In the case of the present invention, a servo-relay is conceived to be a device combining the aspects of a "servomotor" and a "relay."

Generally speaking, a servomotor is conceived of as a device for producing a controlled movement in accordance with some change in a condition such as position, etc., the aforesaid movement representing a more or less considerable amplification of the energy involved in said change.

The concept of a relay, on the other hand, covers a great variety of instrumentalities capable of responding to some variable condition by reproducing a like or different condition having some predetermined relation to the former. A servomotor, therefore, is a particular species of relay, more or less.

In the art of process control, where pneumatic instrumentation is involved, such entities as transmitters, controllers, regulators, and the like are relay-type devices which, in general, do not involve servo-action, that is, the occurrence of substantial movement of mechanical elements thereof is either avoided or at least not sought.

However, in the end, the relay output air pressure in the pneumatic case must result in a substantial movement of a pointer, or of a recorder stylus, or of a process control valve, or the like. The performance of these tasks is a particular advantageous task for a servo-like device and, in fact, so-called valve positioners, designed to precisely position process control valves, have long been in use as standard features of systems for controlling processes of all sorts.

To a somewhat lesser extent, servo-type indicating and recording apparatus have also been devised and put in use. Typical of the general run of such apparatus are self-balancing bridge and potentiometer systems. Systems such as these, however, tend to be relatively expensive, complex, delicate, etc., as compared to pneumatic instrumentation in general.

Nevertheless, insofar as indicating and recording is concerned, the servo-motor principle is, as yet, not widely applied in the pneumatic field. This is perhaps because heretofore a notable degree of success has been achieved in the design of socalled "self-powered" pressure recorders and indicators that are rugged and relatively inexpensive, yet withal reliable, precise and accurate enough, that in the past, the advantages of servo-action have been neglected. Thus, a bellows or Bourdon tube or the like, will receive a pressure to be measured and convert the said pressure to deformation of the bellows, tube or the like, which deformation would be converted to a stylus or pointer motion by means designed to use the energy output of the bellows or tube as efficiently as possible, and to use only that energy energy output to move said stylus or pointer.

These self-powered devices even where intended to drive the apparently nominal load of a pointer, are only as faithful in their response as they are friction-free, low in mass, and so on, and the more exacting are the requirements for precision and reliability, the more difficult it is to combine the characteristics of manufacturing ease, ruggedness, and so forth, with precision and reliability, in the same design.

However, continuous refinement and elaboration of industrial instrumentation has now reached the point where prior art "run of the mill," self-powered types of indicators and recorders are not accurate and precise enough to suit the evermore exacting requirements of process control and measurement. While it is evident that servo-acting instruments would obviate the now-unattractive prospect of refining present self-powered designs, it also appears that few practical and satisfactory servo-type recording and indicating instruments, that are simultaneously sturdy, reliable, inexpensive, versatile, low in maintenance requirements, accurate and precise, have been developed as yet in the prior art.

One general object of the present invention is to provide just such a practical and satisfactory servo-type instrument in the form of a novel pneumatic servo-relay. In terms of pneumatic instrumentation, a novel servo-relay according to the present invention is a relay in that it provides means for transforming the low-energy output of a motional type condition responsive element such as a Bourdon tube or galvanometer, into a proportional air pressure at a high enough energy level to permit transmission of the information content of the response of the element to other instruments and devices operating at a level of energy, or at a distance such that it would be impractical or impossible to apply the element response directly to such other instruments. On the other hand, a servo-relay, according to the present invention, simultaneously produces a powerful long-stroke motion output that is a faithful reproduction of the motional response of the said Bourdon tube or other low-energy element, that can accurately drive indicating and/or recording mechanisms, alarm devices, control devices, and so on, of types having driving energy requirements and energy losses of such magnitude that a low-energy element could not possibly provide, of itself, the necessary drive.

From the foregoing point of view, it is evident that a "servo-relay" is conceived of as a distinct instrumentation component or element of general utility in recording controlling and other types of instrumentation systems. This conception, we believe, is new and, as well, valuable, since it adds to the store of functional building blocks or "black boxes" available to the designer of instrumentation systems.

It follows, therefore, that another general object of the invention is to provide a novel instrumentation component having the characteristics of a servo and a relay.

A particular object of the invention is to proivde a novel servo-relay comprising a pressure regulator type of relay and a long-stroke pressure responsive servo-motor, wherein a low-level pressure control means, such as a baffle and nozzle arrangement, determines the stroke of said servo-motor and the latter, in turn, determines the output pressure of said pressure regulator type of relay.

More specifically, the said servo-relay includes a pressure-regulator mechanism of the type wherein the pressure output of the regulator automatically balances a force applied to said mechanism, and a long-stroke pressure responsive diaphragm device applying said force to said mechanism via a spring converting the long-stroke of the diaphragm device into said force.

Illustrative of the utility of said servo-relay, it is an object of this invention to provide a novel gauge pressure transmitter, including a servo-relay according to the invention, and wherein what amounts to a pressure gauge, or the like, is provided for controlling the pressure applied to said diaphragm device.

The foregoing comprises only the more salient objects of the present invention. Further objects of the invention will be evident upon perusal of the detailed description and of the hereto-appended claims.

In the drawings:

FIGURE 2 illustrates a detail of FIGURE 1;

FIGURES 5 and 6 are respectively a plan view and a sectional view on the line 5—5 of FIGURE 5, of a novel tape movement useful for the purposes of a transmitter in accordance with FIGURE 4;

FIGURES 8 and 9 illustrate a bimetallic baffle for use according to the invention, with the novel servo-relay.

Figure 1:
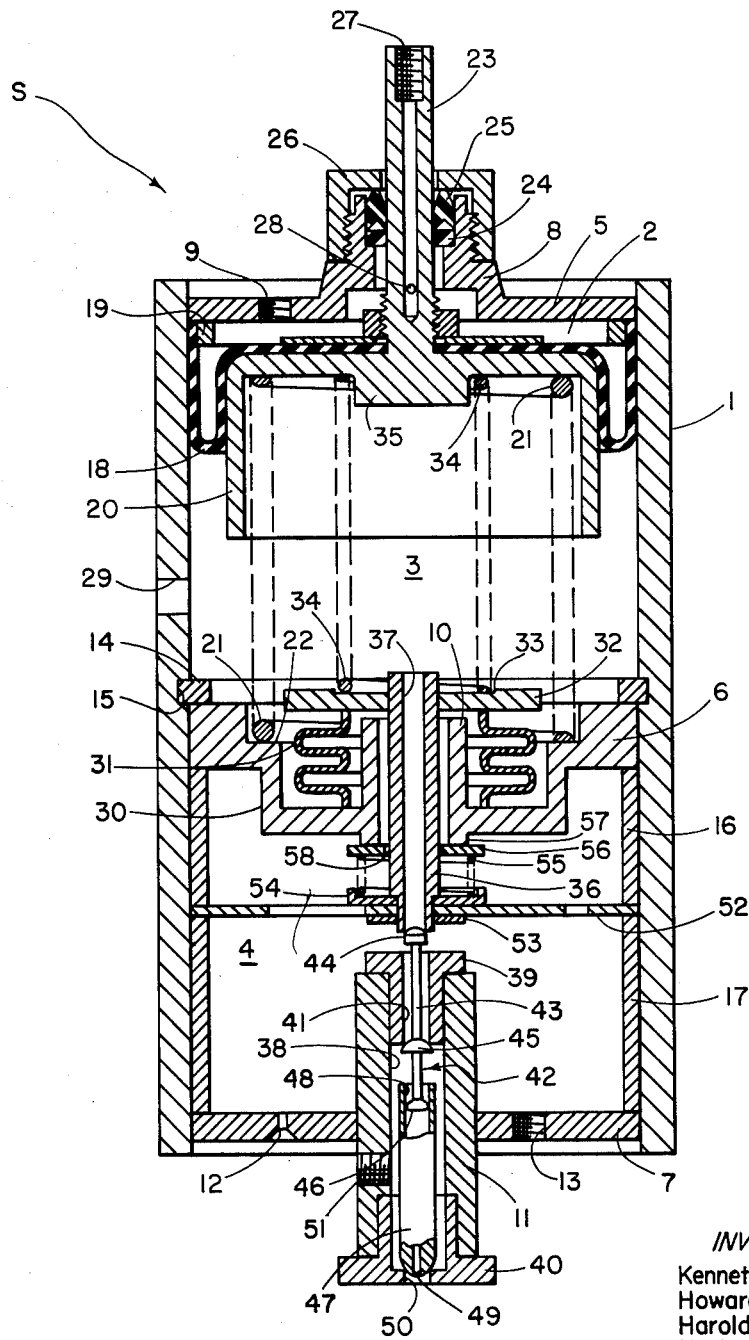
FIGURE 1 is a sectional view, in detail, of a novel servo-relay in accordance with the invention.

In FIGURE 1, a servo-relay S according to the invention includes a barrel or cartridge-shaped casing 1, suitably a length of cylindrical tube-stock, shown to be divided into compartments or chambers 2, 3, and 4 by means of a diaphragm 18 and partitions 5, 6 and 7.

Partition 5 closes the upper end of casing 1 and is a generally disk-like member having a nipple 8 projecting upwardly therefrom and a tapped hole 9 therethrough.

Partition 6 is also a generally disk-like member and has a nipple 10 projecting upwardly therefrom.

Partition 7 is disk-like, having a nipple 11 projecting both upwardly and downwardly therefrom, and a pair of apertures therein, namely, restricted orifice 12 and tapped hole 13.

The said partitions are fixed in position by any suitable means. For example, as shown in FIGURE 1, a snap-ring 14, seating in a groove 15 around the inside of casing 1 provides a seat for partition 6, and a pair of circular spacers 16 and 17 between partition 7 and partition 6 maintains the proper spacing between partitions 6 and 7. Another groove and snap ring arrangement (not shown) may be provided to hold the partition 7 against the lower edge of spacer 17. Since there should be a fluid seal between the inside wall of casing 1 and the peripheries of the partitions, suitable gaskets, O-rings, or the like (not shown), may be provided around the peripheries of the said partitions.

Chamber 2 provides a pressure-input chamber for a long-stroke, fluid-pressure-actuated motor in the form of a limp cut-type diaphragm 18 of rubber or like material. The rim of the diaphragm is sealed against the inner surface of casing 1 about the periphery of partition 5, a simple ring-like member 19 being shown to indicate this feature. The bottom of the diaphragm bends downwardly, inverted cup 20. A spring 21, shown in dotted line for the most part, is seated between the bottom of the cup and a circular ledge 22 sunk in partion 6. The free length of the spring is chosen to be such as to force the cup and diaphragm assembly up against, or very nearly up against partition 5. In any event, spring 21 should be slightly compressed at the lowest pressure that would normally occur in chamber 2. Accordingly, if the force on the upper side of diaphragm 18 be increased over that on the under side of the cup and diaphragm assembly, the bottom of the diaphragm will move downwardly, rolling the sidewall of the diaphragm over itself as the bottom of the diaphragm moves out of the more re-entrant state shown to a less re-entrant state.

A tubular stem 23 projects upwardly from cup 20 through nipple 8, the nipple being counterbored at its upper end to seat a centering washer 24 and a sealing ring 25. The centering washer 24 should be made to fit closely, but not tightly, around stem 23. Suitably, the stem 23 would be metal and the washer 24 a plastic, like Teflon or nylon, to minimize sliding friction while keeping a minimum clearance between stem and washer. Sealing ring 25 is shown as of the lip seal type, since a suitable fluid seal between stem and sealing ring may be maintained thereby with minimum sliding friction. An O-ring seal may also be used, but at the price of more friction. A packing nut 26, screwed on to the upper end of nipple 8, serves to compress ring 25 about stem 23 in the amount necessary to maintain a suitable seal.

At its outer end, tubular stem 23 communicates with the space external to the chamber 2 via a tapped hole 27, and at its inner end by means of a radial aperture 28, freely communicating the bore of the stem 23 with chamber 2.

From the foregoing, it is evident that, except for stem 23 and hole 9, chamber 2 is sealed off from the space external thereto, say the atmosphere. Therefore, if a source of fluid under pressure is connected to either of hole 27 and hole 9, and the other hole is closed, cup 20 will move downward, compressing spring 21, if the source can build up a pressure in the chamber 2 sufficient to overcome the upward forces on the cup. A vent 29 freely communicates chamber 3 with the space external to chambers 2 and 3. Hence, the force up will be the force of atmospheric pressure plus the force of spring 21 (disregarding, for the moment, the effect of an additional spring shown at 34).

Supposing a fluid pressure source capable of creating a superatmospheric pressure to be connected to hole 9, a finger tip placed over the opening in the upper end of stem 27 will cause the stem to move downward an amount depending on atmospheric pressure and the spring constant of spring 21. If the fluid pressure thus created in chamber 2 is great enough, spring 21 permitting, the stem will move away from the finger and down, allowing the fluid to vent from chamber 2 until the opposing forces on both sides of diaphragm 18 are balanced.

On the other hand, connecting the pressure source to stem 27 and closing the hole 9 will cause the pressure in chamber 2 to make the cup and diaphragm assembly to move down until spring pressure and atmospheric pressure jointly balance the pressure built up in chamber 2, or until the moving elements are stopped by some immobile portion of the casing structure.

The action thus desired is that of a fluid-pressure-actuated, linear, long-stroke motor, since as compared to metalic diaphragms, bellows, and the like, the re-entrant configuration of diaphragm 18 permits a relatively large motion while maintaining a constant effective area exposed to pressure. Also, the limpness of the diaphragm 18 assures that the force, opposing the force due to fluid pressure, is practically just that of spring 21 and the atmosphere, together. Hence, unlike its metallic counterparts, diaphragm 18 allows a long stroke of stem 23 but does not introduce non-uniformity into the relation between stroke and fluid pressure.

It is evident that a baffle, a pilot valve, or like means operating at a low-energy level, can be utilized to control the stem-motion, which last involves much higher energy levels.

The foregoing illustrates the servo-aspect of the servo-relay S. As for the relay-aspect, this is illustrated by the lower portion of the servo-relay S, as follows:

A cup-shaped protuberance 30, depending from partition 6, seats the lower end of a bellows 31, having its upper, free end in the form of a circular plate 32, dished at 33 to provide a seat for the lower end of spring 34, the upper end of spring 34 seating in cup 20 about a central, circular boss 35.

A vent tube 36 is fixed to plate 32, the vent tube having a cylindrical bore 37 opening at its upper end in chamber 3, and the said vent tube extending downwardly far enough that the lower end of the bore 37 opens into chamber 4, as shown. Hence, chamber 4 may vent to atmosphere via the vent tube 36 and vent hole 29. Bellows 31 is hermetically sealed to the bottom of protuberance 30 and about nipple 10 projecting upwardly from said protuberance and surrounding the vent tube 36. Nipple 10 therefore communicates the interior of chamber 4 with the interior of bellows 31.

The nipple 11 in partition 7 is provided with a bore 38 having a fitting 39 mounted in its upper end and a fitting 40 mounted in its lower end.

Fitting 39 has a cylindrical bore 41 therethrough, the lower end of which serves as a seat for a plug 44 of a valve 42 consisting of a stem 43 having upper plug 44, an intermediate plug 45, and a lower plug 46 arranged serially thereon. Lower plug 46 extends into a balance tube 47 having an upper cylindrical bore 48 which closely, but not tightly, fits around the plug 46. Balance tube 47 also has a lower bore 49 as a continuation of said upper bore, and the said lower bore connects to atmosphere via a circular aperture 50 in the bottom of fitting 40. The lower end of balance tube 47 is rounded off to seat tightly in aperture 50, and the bore 49 is substantially narrower than aperture 50 so that if tube 47 is seated in aperture 50, egress of fluid from chamber 4 to atmosphere, via tube 47, is possible only past plug 46.

The upper sides of plugs 44 and 45 are rounded off so as to be seatable in the lower end of bore 37 of vent tube 36, and the lower end of bore 41 of fitting 39, respectively. A tapped hole 51 provides for connection of nipple 11 to a supply of fluid under superatomspheric pressure.

What has been thus far described as to the lower portion of servo-relay S is essentially a pressure regulator or, in other words, a fluid pressure relay.

For example, if a pressure gauge be connected to hole 13, a source of fluid at superatmospheric pressure be connected to hole 51, and sufficient downward force be exerted via spring 34, vent tube 36 will move down against plug 44 and force plug 45 downward and out of a seating position in the lower end of bore 41 in fitting 39. As a result, fluid under pressure will flow through bore 38, past plug 45 and through bore 41 into chamber 4, and thence, via nipple 10 into bellows 31.

Eventually, the pressure in chamber 4 will build up enough to force bellows 31 to lift vent tube 36 up enough to separate plug 44 from the lower end of bore 37, since although the flow into chamber 4 from the pressure sources forces valve 42 to follow vent tube 36 up, plug 45 will seat on the lower end of bore 41, thus stopping upward movement of valve 42 and, as well, cutting off bore 38 from communicating with chamber 4.

Therefore, the supply of pressure fluid to chamber 4 becomes cut off and the vent tube vents chamber 4 to atmosphere via vent hole 29. Venting chamber 4 allows bellows 31 to contract, and vent tube 36 moves down to a point where plug 44 again seals the lower end of bore 37. If vent tube 36 comes down far enough, it will again unseat plug 45 and permit supply fluid to enter chamber 4. In any event, the pressure in chamber 4 will be a function of the net downward force exerted on plate 32.

If the seating and unseating actions of plugs 44 and 45 do not occur simultaneously, as they will not for practical purposes, the regulator action will have a dead spot since, for a given pressure in chamber 4, the exact value of force needed to create the given pressure depends on whether the given pressure is reached by increasing the force or decreasing the force exerted by spring 34. To avoid this difficulty, restricted orifice 12 in partition 7 is proportioned to provide a slight leakage to atmosphere of pressure fluid. As a result, valve 42 more or less hovers with plug 44 seated and plug 45 unseated, whereby if the force exerted by spring 34 changes, the new pressure established will be a function of the new value of force independent of the sense in which the spring force change occurs.

Plug 46 and balance tube 47 serve to reduce the dependence of the pressure in chamber 4 on the regulation of supply pressure admitted via hole 51. Normally, valve 42 and balance tube 47 maintain their respective operational positions simply by virtue of the fluid pressure acting through bore 38.

It will be noted that plugs 44, 45 and 46 and balancing tube 47 have effective areas associated therewith, which areas are subject to the various pressures involved, viz., supply pressure, pressure in chamber 4, supply pressure in bore 38, and the pressure external (atmosphere, say) to casing 1. The said areas, of course, are determined by the cross-sectional areas of bores 37, 41 and 48, of stem 43, and of aperture 50.

With respect to atmospheric pressure, the effective area of plugs 44 and 46 are chosen to balance each other. However, the effective area of plug 45 is chosen to be enough larger than that of plug 46, that the net effect of supply pressure in bore 38 will be able to seat plug 45 in the face of the combined force due to the weight of the plugs and of tube 47, and due to the corresponding effective areas thereof exposed to supply pressure. The weights involved are very small, hence, it is easy to make the effective area of plug 45 large enough that the seating effect predominates throughout a wide range of supply pressure variation.

Likewise, the effective area of the lower end of balance tube 47 is chosen to be enough larger than that of plug 46 that the supply pressure maintains the seal of around the said lower end at aperture 50, in the face of any tendency of plug 46 to pull the balance tube up should there be any tendency of plug 46 to stick in the tube. However, if plug 46 does stick in balance tube 47, valve 42 and tube 47 will simply move as one, wasting more air than is normal, but nevertheless permitting the regulator to continue providing an output pressure having the correct relation to the force exerted by spring 34.

On the other hand, the effect of the existence of plug 46 is enough to satisfactorily reduce the effect of supply pressure variation on regulated output of the relay mechanism, i.e., the effective area of plug 46 creates an effect opposed to the effect of the effective area of plug 45, in the event of supply pressure variation.

It will be evident from the foregoing that if plug 46 sticks in balance tube 47, the relay will still operate, at the price of increased consumption of pressure fluid, since the valve 42 will simply drag balance tube 47 along with it. Balance tube 47 could be fixed in position but then, the relay would become inoperative should plug 46 stick in the bore 48 of the balance tube.

As a further refinement, plug 44 and bore 41 are dimensioned so that plug 44 slides freely through bore 41. This greatly facilitates servicing the relay, since valve 42 and balance tube 47 can be removed merely by unscrewing fitting 40.

The plugs 45, 46 and 44, and the lower end of balance tube 47 being rounded, it will be evident that the parts involved need be only approximately centered in assembling the servo-relay, if there be provided means for keeping the vent tube 36 centered on the axis of the casing.

Accordingly, a centering spring or stay plate 52 is secured at a central portion thereof to vent tube 36 and to opposite points at the wall of casing 1, in this instance between spacers 16 and 17. Although stay plate 52 may be a simple flat spring strip, preferably a W-spring of the form shown in FIGURE 2, is provided. As is well known, the center of a W-spring moves in a straight line (i.e., the normal to the plane of the paper in FIGURE 2), when the center of the spring is displaced out of the general plane of the spring in its unstressed state. As a result, the stay plate 52 and bellows 31, between them, keep vent tube 36 in a centered position.

As shown in FIGURE 1, the stay plate 52 is perforated at its center and clamped to the lower end of vent tube 36 by means of a nut 53, or the like. In addition, a spring seat 54 is provided, surrounding vent tube 36 just above stay plate 52, and a spring 55 is seated between said spring seat and a damping washer 56, the upper surface of which rests on a slight extension 57 of nipple 10 below the bottom surface of protuberance 30.

The upper surface of washer 56 and the lower surface of extension 57 are provided with flat, fairly smooth finishes so that the force of spring 55 seals washer and extension fairly tightly together. This leaves an annular restriction 58 between vent tube 36 and washer 56 (the clearance between vent tube 36 and the surrounding inner surface of nipple 10 is large in comparison). Such restriction is desirable to damp the flow of fluid between the interior of bellows 31 and chamber 4.

If washer 56 were a fixed element, say, a part of partition 6, stay plate 52 would have to center vent tube 36 very accurately with respect to the aperture in washer 56. Since washer 56 is movable laterally, it inherently accommodates itself to eccentricity of vent tube 36 relative to the centerline of nipple 10. Hence, the clearance between vent tube 36 and washer 56 remains an effective damping restriction because the smooth, juxtaposed surfaces of extension 57 and washer 56 maintain a seal between washer and extension, even though the washer may be shifted laterally.

Another useful property of the damping washer arrangement resides in how it lends itself to the minimization of friction effects. The frictional force on washer 56 depends on spring 55, and generates a frictional force on vent tube 36 (if it contacts the inner peripheral surface of the aperture in the washer) opposing the up and down motions of the vent tube. At first sight, it may seem that the way to minimize drag on the vent tube would be to make spring 55 very light and the next adjacent surfaces of washer 56 and extension 57 mirror smooth. However, this is unnecessary, for the force normal to the direction of the friction force of vent tube 36 is the force normal to the aforesaid surfaces multiplied by the coefficient of friction between those surfaces. Moreover, the said friction force is the said force normal multiplied by the coefficient of friction between the inner periphery of the washer aperture and the vent tube 36. Therefore, the frictional drag between vent tube and washer is proportional to the force normal to the next adjacent surfaces of washer 56 and extension 57 multiplied successively by the mentioned coefficient of friction. Accordingly, if the several said coefficients of friction both be made rather small, say, both around 0.2, the force of spring 55 is not very critical since its effect on vent tube 36 will be about as the square of 0.2, or 0.04. Hence, the smoothness of the next adjacent surfaces of extension 57 and washer 56 need be no better than to assure that air flow therebetween is much less than through the net restriction between the vent tube inner periphery of the aperture in washer 56. If tube, rim and washer be made of material selected from the materials brass and aluminum, for example, vanishingly small frictional drag of the washer 56 on vent tube 36 is assured without taking particular pains as to finish of the mating surfaces of washer 56 and extension 57.

Having in mind now both the servo and relay functions of servo-relay S, it is evident that the pressure in chamber 2, controls both the position of stem 23 and the pressure in chamber 4. Therefore, controlling the pressure in chamber 2 in accordance with some law, schedule or physical effect, causes the servo-relay to produce both mechanical effects and fluid pressure effects that follow the pressure in chamber 2.

The servo-relay performs its servo and relay functions as described above with reliability and precision, yet it is an assembly of parts that can be fabricated by the simplest of machining procedures from stock material and that can be assembled into a finished unit using the simplest of tools. Every structural element of the servo-relay has its center on a single line (the vertical bisector of the view of FIGURE 1) and, save for an occasional hole such as restricted orifice 12, each element but stay plate 52 is radially symmetrical relative to the said line.

The view of FIGURE 1 is approximately to scale, although clearances and thicknesses of parts have been exaggerated for clarity, and units patterned after FIGURE 1 are approximately half the proportions shown in the view of FIGURE 1 appended to this application (save for stem 23 which is several times longer, proportionally speaking, than indicated in FIGURE 1).

The pressure in chamber 4 works against atmospheric pressure, the spring constant of bellows 31 and the force exerted on the bellows via spring 34. Since the nature of the regulator action requires but a very slight movement of valve 42 for it to go from freely venting chamber 4 to pressurizing chamber 4, and vice versa, the compressed length of spring 34 is affected practically not at all by the pressure regulator action. In other words, the pressure regulator portion of the servo-relay is a force-responsive device that reacts to an applied force with an equal and opposite force that prevents the occurrence of any appreciable net motion of the parts involved.

Assuming a typical pressure fluid supply of air at 20 p.s.i.g. supplied through hole 51, the spring constant of spring 34 is conveniently chosen such that the pressure measured at hole 13 changes from about 3 p.s.i.g. to 15 p.s.i.g. for the full range of movement of stem 23, approximately ¾ of an inch on the scale of FIGURE 2 (i.e., ⅜ of inch in a typical commercial unit using typical long-stroke motor units such as a so-called Bellofram).

For sensitivity of the regulator to force change, the spring constant of bellows 31 should be quite small. To avoid lost motion and for sensitivity of the servo-action, it is preferable that spring 34 exert an initial force on bellows 31 such that the regulator output be 3 p.s.i. with 6 p.s.i.g. reigning in chamber 2 with stem 23 in its uppermost position. The 3 p.s.i. figure is the conventional pneumatic instrument zero. Spring 34 should be quite linear throughout the range of deformation it is to undergo, and it and springs 21 and 55 are compression springs, as shown.

Spring 21, on the other hand, is not cricital, since it has no quantitative role to play, although the stiffer it is, the higher its resonant frequency, which is desirable. It should not be so stiff, however, that it is impossible for the maximum possible pressure change in chamber 2 (assuming a value of supply pressure given) to drive the pressure regulator portion of the servo-relay over the desired range of pressure output. Usually, the case will be that full stem travel should create a change of output pressure as large as the supply pressure will permit. In practice, a suitable value of the spring constant of spring 21 is one that, taken with the friction on stem 23 (mainly that due to lip-seal 25) permits the stem to start down when the pressure in chamber 2 exceeds 6 p.s.i.g.

All vents, flow passages, and the like, except orifice 12, annular restriction 58 and the clearance of plug 46 in bore 48 are large enough not to impede flow of fluid appreciably. This includes the flow passages between plugs 44 and 45 and the respective lower ends of bores 37 and 41, when the said plugs are not seated therein.

It will be noted that the ambient atmosphere of the servo-relay, i.e., the external pressure acting through hole 29 and restriction 12, may be higher or lower than atmospheric pressure, as long as there is sufficient differential between supply and ambient, to power the instrument.

Since as pointed out previously, the pressure in chamber 2 of the servo-relay may be controlled by low-energy means, the servo-relay, by virtue of its pressure regulator mechanism and the long, powerful stroke of its servo-elements, is a most versatile and at the same time simple and economical instrumentality for serving as an intermediate stage between measurement of process condition and utilization of the information contained in the measurement for such purposes as recording, indicating, remote transmission of measurements, and so on, which are actions best carried out at energy levels greater than those at which most primary measuring elements, such as Bourdon tubes, and other transducers, operate.

Figure 3:
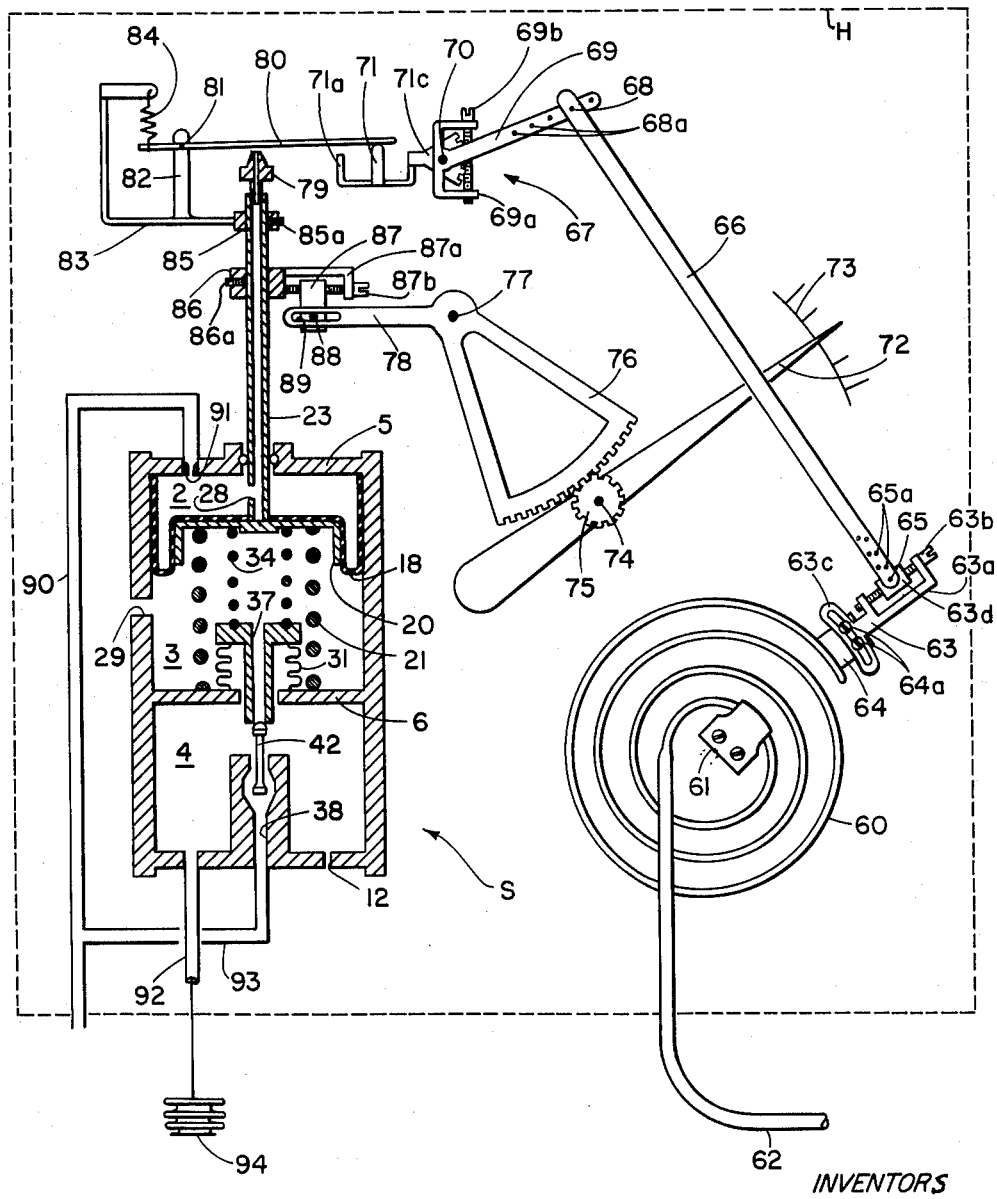
FIGURE 3 illustrates schematically a novel gauge pressure transmitter according to the invention.

FIGURE 3 illustrates use of our novel servo-relay in an indicating gage pressure transmitter having a Bourdon tube 60, one end of which is fixed in position by a suitable clamp 61 and is connected by a pipe 62 to some source of fluid pressure to be measured. A mounting plate 64, fixed to the free end of the tube 60 has a takeoff arm 63 fixed thereto, and the said arm is pivotally connected by a pivot 65 to a link 66. In turn, link 66 is pivotally connected to one end of a lever 67 by means of a pivot 68, and lever 67 is pivoted at an intermediate portion thereof to a pivot 70, fixed in space, the other end of lever 67 having a baffle-deflector 71 projecting upwardly therefrom. As shown, arm 63, link 66 and lever 67 provide for certain adjustments, to be described infra. For the time being, it suffices to treat arm, link and lever as three movable elements of a simple four-bar linkage.

Since it is desired to indicate the pressure admitted to Bourdon tube 60 via pipe 62, a pointer 72, playing over a suitably calibrated scale 73, is provided. Pointer 72 has a staff 74 and pinion 75 fixed thereto, staff 74 being supported by any suitable means for rotation in place. A sector 76 pivotally secured to a pivot 77, fixed in space, is engaged with pinion 74 and has an arm 78 secured thereto by means of which sector 76 can be deflected about the pivotal axis established by pivot 77.

As will be recognized by those skilled in the art, the foregoing is more or less a description of the elements of a pressure gauge because the Bourdon tube winds and unwinds in approximate proportion to decrease and increase, respectively, of fluid pressure admitted thereto via pipe 62, relative to fluid pressure acting externally on the tube. That is, arm 63 takes up an angular position with respect to an approximate center located somewhere in the vicinity of the fixed end of the Bourdon tube, which position is reflected by the angular position of lever 67 with respect to the pivot axis of pivot 70. Likewise, the position of pointer 72 on scale 73 reflects the angular position of sector arm 78 with respect to the pivot axis of pivot 77 and, if the deflections of lever 67, consequent upon change in pressure in Bourdon tube 60 were transferred to arm 78, the position of pointer 72 on scale 73 would be a measure of said pressure.

The various pivotings and deflections are supposed to occur in planes generally parallel to the plane of the figure, of course, and with respect to some common fixed reference such as an intrument casing or other means housing and/or supporting the mechanism shown in FIGURE 3. As will appear further on, hereinafter, suitable linkage adjustment means are provided to adjust the linearity, span and zero characteristics of the linkage secured to the Bourdon tube, and so on. It is also to be remarked that pressure responsive devices other than a Bourdon tube, galvanometer-type devices, bi-metallic temperature-sensing elements, and other types of condition responsive devices or so-called "primary elements," providing some sort of movement at a low-energy level, and as a function of a variation in some condition, might be used for the purpose of the present illustration.

In any event, primary elements such as the Bourdon tube 60 are in general relatively low-energy, small-movement devices. Where accuracy and reliability of indication is required, the mechanism, involved in transforming the condition response of such primary element into a scale reading must usually be in the nature of a precise and delicate instrumentality. However, the disadvantages of this, too well known to set forth here, may be obviated by amplifying the energy and/or motion of the primary element, e.g., Bourdon tube 60, somewhere between the primary element and the means for indicating the response of the primary element to the variable condition affecting it.

Our novel servo-relay S is a most convenient and desirable amplifier for such purposes, not only because it possesses the necessary servo action for transforming a small, low-energy motion into a long-stroke, high-energy motion, but also because in so doing, its relay action, in creating a fluid pressure reflecting the servo action, provides a convenient means for transmitting the response of the primary element to a near or remotely located indicator, controller, recorder or the like.

In order to take advantage of the long-stroke, servo action of servo-relay S, we provide a nozzle 79 in what would be the tapped hole 27 shown by FIGURE 1 in the end of stem 28, and a baffle 80 to be actuated by lever 67. A pivot 81 pivotally secures baffle 80 near one end thereof to a post 82 projecting from an angle 83, the angle 83 being fixed to a collar 85, fitting around stem 23, a set screw 85a, or other suitable means being provided, preferably in order to adjustably fix the height of collar 85 on stem 23.

Angle 83 extends up around the one end of baffle 80 and is connected at its upper end to the said end of baffle 80 by means of a light tension spring 84. The various parts depicted are so positioned that the other end of baffle 80 is urged by spring 84 into contact with the baffle deflector 71, the intermediate portion of baffle 80 lying directly over nozzle 79 so that counterclockwise deflection of lever 67 will cause the baffle 80 to approach nozzle 79, the clockwise deflection of lever 67 will cause baffle 80 to retreat from nozzle 79. Taking those portions of nozzle 79 and baffle 80 next adjacent each other to be so formed that close enough approach of baffle 80 to nozzle 79 will impede flow of fluid through said nozzle, it is evident that if fluid under pressure, suitably air, be supplied chamber 2 of servo-relay S, pressure will build up or not in chamber 2, over the fluid pressure in chamber 3 of relay S depending, respectively, on whether or not baffle 80 is or is not impeding air flow out of nozzle into the region, i.e., atmosphere, communicating with chamber 3 via vent 29. Accordingly, a pipe 90, connected at one end to a suitable supply of air under pressure, is connected at its other end to what FIGURE 1 shows as the hole 9 in partition 5 of the servo-relay S, an orifice 91 being provided at the end of said pipe. The relative flow-restricting effects of orifice 91 and nozzle 79 would normally be so proportioned that fluid flows more freely through the latter than through the former.

From the foregoing, it will be evident that fluid pressure increase in chamber 2, due to baffle 80 impeding the flow out through nozzle 79 will cause stem 23 to move downward.

A collar 86, preferably adjustably-clampable on tube stem 23 by a set screw 86a, or other suitable means, is also secured to stem 23 as a motion take-off, the collar having a block 87 fixed thereto. As shown, provision is made for adjusting the position of the block 87, as will be described infra. For the time being, block 87 may be deemed a fixed part of collar 86. A lengthwise slot 89 in arm 78 receives a pin 88 fixed to the said block 87.

The parts are so adjusted that when the difference between the internal and external pressures on Bourdon tube spring is zero, i.e., 0 p.s.i.g., then stem 23 is at or near its uppermost position with nozzle 79 spaced just far enough from baffle 80 (now fixed in position by spring 84 holding it against baffle deflector 71) that some predetermined minimum pressure exists in chamber 2 such that the springs acting upwardly on cup 20 prevent the cup from moving downwardly, yet push upward with insufficient force to move the cup up further.

Under these conditions, the position of pointer 72 on scale 73 may therefore be marked 0, or the lowest value of the desired range of response of tube 60. If, then, the fluid pressure inside Bourdon tube 60 increases over the external pressure thereon, baffle 80 approaches the nozzle 79, the egress of fluid from nozzle 79 will become more impeded, and as a result, the pressure in chamber 2 increases and pulls stem 23 down. In actual practice, a thousandth of an inch or so of change in spacing, between the portions of baffle 80 and nozzle 79 next adjacent each other, suffices to cause the flow impeding effect of baffle 80 to change between maximum and minimum. Hence, a relatively slight counterclockwise movement of arm 63 of Bourdon tube 60 suffices to build the pressure in chamber 2 to very nearly its maximum possible value, and as a result, a powerful downward movement of stem 23 results which is quickly arrested by loss of fluid through nozzle 79 when the nozzle manages to escape from the baffle, the final position of stem 23 being one where the baffle throttles nozzle flow just enough to maintain the pressure in chamber 2 at a value balancing the spring force on cup 20.

If arm 63 now moves clockwise, baffle 80 is moved away from nozzle 79, flow of fluid out of nozzle 79 increases, dropping the pressure in chamber 2, and the spring force on cup 20 elevates stem 23. When nozzle 79 catches up with baffle 80, the flow-impeding effect of baffle on nozzle increases pressure in chamber 2, which stops upward movement of stem 23.

Thus, the force upward on cup 20 is always maintained in equilibrium with the force down, due to the pressure in chamber 2, and for every angular position of arm 63 there corresponds a vertical position of stem 23 and a position of pointer 72 on scale 73.

But for a simple linkage and light spring 84, Bourdon tube 60 effectively responds to pressure changes as if unloaded. However, baffle motion produces a large change in the force load on cup 20 that accurately, and nearly independent of friction in the moving parts of servo-relay S and of the indicating mechanism driven thereby, changes the position of pointer 72. Hence, pointer 72 may be driven by a rugged and simple gauge movement, such as the toothed sector and pinion arrangement illustrated in FIGURE 3, and ancillary devices, such as limit switches, can be actuated by the servo-relay, without degrading the accuracy of the indication. In fact, as long as the maximum change of pressure in chamber 2, due to baffle-nozzle action, remains sufficient to drive stem 23 the entire extent of its desired range of movement, friction is no concern.

As will be seen from FIGURE 3, the relay section of servo-relay S also measures the force exerted on bellows 31 by spring 34 as the stem 23 moves up and down under the control of pressure in Bourdon tube 60, there being a pipe 93 connecting the pressure source for pipe 90 directly to chamber 4 via what FIGURE 1 would show to be hole 51, and thence to bore 38, in order to power the relay action of servo S as described in connection with FIGURE 1. For clarity and brevity, the showing of servo-relay S in FIGURE 3, has been greatly simplified, e.g., the balancing refinement of valve 42 has been omitted and so on. It will be seen, however, that the basic structural features and their functions of the relay S, as shown in FIGURE 3, are the same as those of the relay as shown in FIGURE 1.

To utilize the relay action of servo-relay S, a bellows 94 connected by a pipe 92 to what FIGURE 1 shows to be hole 13 in partition 7, is provided. Bellows 94 represents the basic operative input element of a pressure responsive controller, indicator, recorder, or the like, which input element may take any suitable form such as a diaphragm, Bourdon tube, and so on.

From the foregoing, it will be seen that by integrating the rugged, compact and inexpensive servo-relay with what amounts to the elements of a simple pressure gauge, or the like, we obtain an indicating transmitter that performs the dual function of transforming the response of the gauge's primary element into a precise and reliable scale indication of the response of the primary element and into a fluid pressure precisely and reliably representing the said response, and capable of being transmitted to a distance as well. The dual action of the servo-relay provides its mechanical and fluid pressure outputs at a considerable energy gain over the relatively feeble capacities of the primary element, imposing as little or less load on the primary element than the latter would bear if arranged to directly furnish the energy needed to drive an indicating mechanism.

Figure 4:
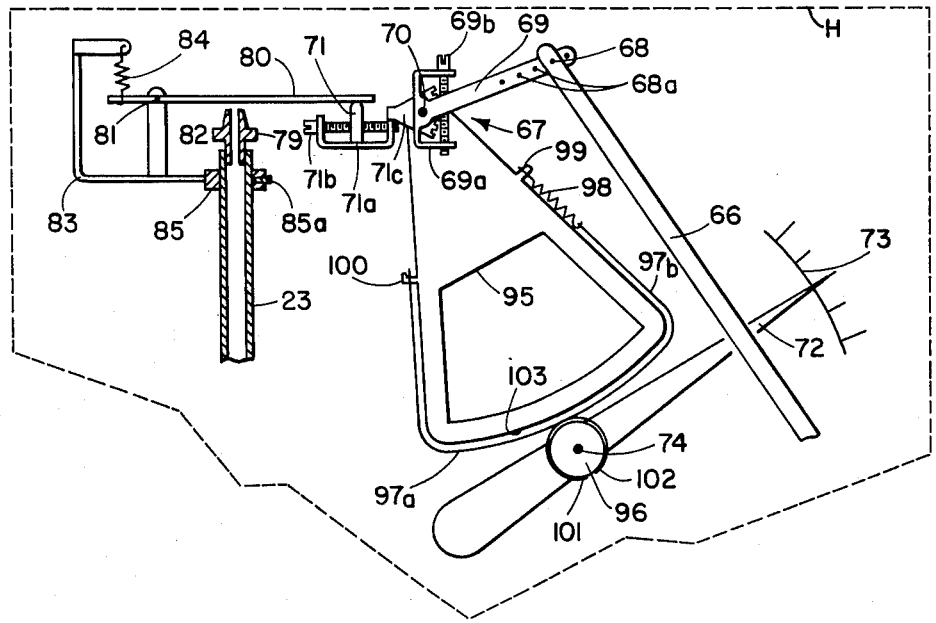
FIGURE 4 illustrates, fragmentarily, a variant of the transmitter of FIGURE 3.

In a variation on the scheme of FIGURE 3, we also provide a novel mechanical movement for driving a pointer. The said movement is inexpensive, precise and rugged, yet is also capable of being driven directly by the primary element, e.g., Bourdon tube 60, without loading the primary element to an undesirable extent. Our novel servo-relay finds its utility in such an arrangement for its relay action, since analogous to the arrangement shown in FIGURE 3, the servo action of the servo-relay permits sensing the indication, in effect, of the directly driven pointer, without loading the primary element in so doing. FIGURE 4 illustrates such an arrangement, being patterned after FIGURE 3, though omitting much thereof that would be superfluous if shown in FIGURE 4.

It will be noted that the elements shown in FIGURE 4 are the same as those shown in FIGURE 3, except that the stem has no mechanical connections to pointer 72. Instead, the lever arm 67 has a sector 95 affixed thereto so that as lever 67 deflects around the pivot axis of pivot 70, sector 95 deflects with it.

The pinion 75 on pointer staff 74 is replaced by a smooth-surfaced cylindrical segment 96, and segment 96 and sector 95, also smooth-surfaced at its periphery 103, are interconnected by a pair of flat tapes 97a and 97b. Tape 97a is secured at one end to a post 100 projecting from sector 95. The remainder of the tape 97a is brought over the periphery 103 of the sector, passed between the sector and segment 96, and fixed at 102 to the periphery of the segment.

Tape 97b is secured at one end, via a spring 98, to a stud 99 projecting from the sector. The remainder of the tape 97b is brought over the periphery 103 of the sector, passed between the sector periphery 103 and segment 96 and secured at 101 to the periphery of the segment.

Preferably the tapes are strips of very thin metal, substantially perfectly flexible (i.e., not offering resistance to bending), and inextensible, and having their ends welded to the segment, spring 98 drawing them tightly up against the peripheral surface of segment 102 and the peripheral surface 103 of the sector. One tape is actually displaced from the other, relative to the direction of the pointer staff 74, so that the sides of the tapes do not rub together. The exaggerated clearance shown in FIGURE 4 as existing between tapes and next adjacent peripheral surfaces of segment and sector has been introduced for clarity.

As sector 95 deflects, segment 96 rotates pointer 72, the pulley-action of the tapes assuring one to one correspondence of sector deflection and segment rotation, just as the toothed engagement of rack 76 and pinion 75 in the species of FIGURE 3 is supposed to do. However, as compared to rack 76 and pinion 74, the tape connection between sector 95 and segment 96 is substantially frictionless, free of play or binding and not open to wear and tear effects, such as would affect the engaged teeth of the rack and pinion. Furthermore, the torque to be overcome in deflecting sector 95 remains constant, so that the only variable opposition to deflection of the sector is that due to the changing orientation of the sector (and doubtless other elements of linkage) with respect to gravity, which can be obviated if desired, by counterbalancing the sector and/or other relevant elements, e.g., the linkage connected to said sector.

The tape-connected sector and sector mechanism is relatively inexpensive, and being both precise and relatively free of friction effects, is well suited for direct operation by primary elements such as Bourdon tube 60.

Aside from the mode of pointer actuation, the species of FIGURE 4 is otherwise identical structurally and functionally to the species of FIGURE 3. That is, the primary element deflects lever 67, and the servo-relay, by its servo-action causes nozzle 79 to follow baffle 80 and, simultaneously, the pressure regulator action of the servo-relay creates a fluid pressure that can be transmitted to suitable apparatus for utilization as a representation of the fluid pressure or other condition affecting the primary element.

It will be obvious to those skilled in the art that the mechanism operatively connecting the primary element to the servo-relay S may vary widely in nature. In fact, since the following or servo action of stem 23 does not appreciably load said mechanism, there is practically no limit to the varieties of means for interconnecting primary elements, however low-powered, to the baffle. For example, Bourdon tube 60 could have the baffle 80 fixed thereto like the arm 60, and be supported adjacent but separate from stem 23 so as to directly move baffle 80 with respect to the nozzle. Such modification would in no wise effect the action of servo-relay S in following baffle 80 and producing an equivalent output pressure in bellows 94.

FIGURES 5 and 6 illustrate in more detail the tape drive shown in FIGURE 4.

Referring to FIGURES 5 and 6, the tape drive is supported by means of a base 104 (not shown in FIGURE 5) and plate 105, there being provided a pair of posts 106, fixed to base 104. Plate 105 is supported on posts 106, a pair of screws 107 securing the plate 105 in fixed position on the posts 106.

Base 104 has a pair of nipples 108 and 109 projecting therefrom, each provided with a rotary bearing 110 of any suitable type to support one end of one or the other of a pair of shafts or staffs 111 and 112 running through the nipples 108 and 109.

Each of shafts 111 and 112 have a collar 113, or like means to limit axial play thereof, the left-hand end of said shaft 111 being pointed to rotatably support the said shaft in a conical depression in plate 105. A different disposition is made of shaft 112, however, to be described later. A minor amount of axial play of the shafts is provided to permit them to rotate freely. In terms of the description of FIGURE 4, shaft 111 provides pivot 70 and shaft 112 provides staff 74.

A sector 114, corresponding to sector 95 of FIGURE 4 is fixed to shaft 111, projecting radially from the shaft for deflection thereby between plate 105 and base 104. A collar 67a, fixed in position on shaft 111, by means of a set screw 67b, is provided as a means of securing lever 67 (not shown in FIGURE 6) to shaft 111.

Shaft 112 has a cylindrical segment 115, corresponding to segment 96 of FIGURE 4, fixed thereto for rotation of said shaft by said segment 115, the cylindrical axis of the latter lying on the axis of rotation of shaft 112.

Tapes 116a and 116b, corresponding to tapes 97a and 97b, interconnect segment 115 and sector 114, as the latter pair of tapes interconnect segment 96 and sector 95 in FIGURE 4. An apertured plate 117, secured to one end of tape 116b, as by a spot weld, is hooked over a lug 118 projecting from sector 114. An apertured plate 119, secured to end of tape 116a, as by a spot weld, is hooked to one end of a spring 120 and said spring has its other end hooked into an apertured ear 121 projecting from sector 114.

Each of the other ends of tapes 116a and 116b are fastened to the peripheral surface of segment 115, as by spot welds, or other suitable means. A smoothly curved plate or shoe 122 completes the tape drive, said plate being secured to the circular periphery of sector 114 to provide a cylindrical surface on which the thin tapes may be substantially flush with the surface of the plate. The extremities of the plate are curved smoothly around to direct the sector ends of the tapes to their points of fixation on sector 114.

Preferably, sector and segment, as well as the tapes, are metal and, for strength and stability and for lightness, both segment and sector may be built up into their illustrated shapes from sheet stock of any suitable, relatively-light but strong metal.

A tape drive as described above has very little friction and, using substantially perfectly flexible and inextensible metal tapes, the main force opposing deflection of the sector is spring 120 and is very nearly constant with respect to angular position of the sector.

Tapes and spring 120 are dimensioned so that the tapes are under a continual tension in all positions of sector 114. This tends to draw segment 115 up against the surface of plate 122, with the tapes 116a and 116b sandwiched in between. Any deviations from cylindricity of the surface of either of segment 115 and plate 122 of sector 114, or variation in tape thickness will cause segment 115 to push away from, or pull toward plate 122. Accordingly, we provide a slot 123 in plate 105, said slot lying more or less along a radius of sector 114. As a result, a very slight amount of side play in bearing 110 of nipple 109 will permit shaft 112 to move up and down with the dimensional irregularities mentioned supra. Were the left-hand end of shaft 112 rotatably supported in a conventional rotary bearing in plate 105, the cocking of the shaft due to the effect of dimensional irregularities of plate 122, segment 115 and/or the tapes, would create undesirable wear and friction in the tape mechanism, unless an undesirably large amount of play were provided in the bearings. The slot 123, on the other hand, provides the necessary play substantially only in the up and down sense needed, the sides of the slots performing the function of preventing staff 112 from cocking to one side or the other when sector 114 deflects.

The tape mechanism is also suited for use in the place of the toothed rack and pinion shown in the species of FIGURE 3. This is because, unlike the rack and pinion with meshing teeth, the tape drive does not depend on the proper positioning of a rack shaft and a pinion shaft to cause the rack and pinion teeth to intermesh properly. In the tape drive, the corresponding role is played by the tapes, the bearings of shaft 112 only being required to prevent displacement of the shaft along the arc of movement of sector 114. Therefore, bearing play is for the most part of little moment. The servo action of servo-relay S is relatively powerful, however, and much larger amounts of bearing play can be tolerated than where the primary element, as intended in the species of FIGURE 4 directly drives the tape mechanism.

The tapes 116a and 116b are preferably made as thin and as low in spring rate as possible, suitably 0.0015 in. thick Elgiloy or stainless steel. The abruptness of curvature of segment 115 is limited to that which the tapes will bear without being overstressed. The length of that part of plate 122 which must be truly cylindrical must be sufficiently longer than that needed to traverse a scale of given length, that at neither limit of said scale will a portion of tape bent around either extremity of plate 122 begin to wrap on segment 115. Obviously, the linearity of the ratio between sector deflection and rotation of shaft 112 depends on the plate 122 and segment 115 being truly cylindrical at their juxtaposed surfaces and on tapes 116a and 116b being of uniform thickness. As the term "segment" suggests, segment 115 need have a cylindrical surface only to the extent required to provide for wrapping the tapes flush thereon, in this case, about 270° around the segment axis.

Since the effective tape length includes spring 120, the tape-inextensibility requirement may seem to be nugatory. However, the desideratum is that there be no permanent change in tape length due to stress in the tapes. This is the case if the tapes are indeed "inextensible," and presuming that spring 120 behaves as a good spring is supposed to behave.

It will be noted that the foregoing description of the tape and sector and segment drive imply a necessity for each tape to reverse its curvature in zero distance; in other words, pass through a point of inflection as it would were it of zero thickness, and the sector and segment were spaced from each other by zero-distance. That is, the tapes are means of achieving the effect of a direct and perfect frictional line contact between sector and segment.

However, it is impractical to try to realize such a state of affairs, even within the limits of the 0.0015 thickness of practical tapes. The reason is that each tape is not perfectly flexible, wherefore, as its configuration is constrained to increasingly approximate the inclusion of a point of inflection, a larger and larger bending moment is required. With typical tape material, it is found that the stress required to overcome this bending moment is so high at a sector and segment spacing of the tape thickness that an undesirably large reaction due to the bending moment tends to force sector and segment apart. The reaction is so large as to create an inordinate amount of friction in the bearings of shafts 111 and 112.

On the other hand, as the spacing between sector and segment increases, there results a decrease in the angle subtended by tangentially directed components of tape tension on the segment decreases. Since the said components both coact to pull the segment toward the sector, their resultant component of force directed toward the sector axis and along codirectional radii of segment and sector increases.

In addition, as the sector deflects from a centered position, the said tangential components vary inversely to each other from a state of equality existing when the sector is in the centered position, where equal lengths of the tapes are pulling against each other. Hence, tape tension also creates a centering effect on the sector in that a force is created, upon sector deflection that is proportional to the deflection from the centered position (equal lengths of tape pulling against each other—the position suggested by the illustration of the tape movement in the several figures), and opposing deflection from that position. This centering effect is undesirable, especially where the tape movement is driven as in FIGURE 4, since it would exert a variable loading on the driving element, as for example, a Bourdon tube.

These tension effects become more pronounced as sector-segment spacing increases. Since the previously-described tape bending moment effect decreases as the said spacing increases, there is some optimum sector-segment spacing, greater than a thickness of a tape, and the lesser in absolute magnitude, the thinner the tape. This optimum is most practically defined as—and determined by— the spacing at which the friction-torque, to be overcome in setting the segment 96 in motion by deflecting sector 95, is at a minimum.

With an 0.0015–0.0018 in. Elgiloy or equivalent tape, about 0.004 to 0.007 in. is optimum as sector to segment spacing, on the foregoing basis. Since the tension in spring 120 controls the spacing (because of the spring's tendency to flatten the tape where it comes off the segment), the spring is chosen to be just strong enough to pull the segment to the right distance from the sector. The right distance, of course, is that distance at which the torque needed to turn the sector is a minimum.

Deviations from uniformity of dimensions, as tape thickness and sector and segment curvature require a certain amount of bearing play, and this is minimized by building most of the play into the mechanism by providing one bearing in the form of slot 123. In theory, however, the bearings could be all conventional rotary bearings of circular form so located and providing just enough play so that the various effects described above as tending to create bearing friction, would be nullified. However, insofar as the tape bending-effect and tape-tension effect comprise is concerned, manufacturing tolerances would be such that proper bearing location for optimum segment-sector spacing would be separately determined for each tape movement.

The slot 123 completely obviates any need to determine proper bearing location separately for each tape movement, the reason being that the slot 123 permits the shaft 112 to seek its own level, so to speak, and that level happens to be one wherein the spacing between sector and segment is optimum, not only insofar as dimensions and variations are concerned, but also with respect to the tape-bending effect and the tape-tension effect.

The resultant sector-segment spacing is sufficiently small that the tension effect, i.e., that effect leading to a centering tendency on the part of the sector is practically zero. As a result, the winding tension due to the bending moment involved in wrapping the tapes flush to the segment and sector surfaces simultaneously increase and decrease as one tape respectively wraps and the other unwraps, and cancel out, so that the torque needed to deflect the sector is determined solely by frictional and gravitational effects in the parts of the movement and is substantially independent of the stiffness per se of the tapes, and of the spring 120.

Other novel features of the tape movement worthy of note relate to the location of shaft 112 and its bearing 113. It is found that if the effective point of application of tape tension to segment 115 is about four or more times as far to said bearing 113 as it is to the slot 123, the bearing thrust due to said tension is predominantly created against the side of slot 123. Therefore, if the bearing end in slot 123 of shaft 112 is made quite small, particularly with respect to the bearing portion of shaft 112 in its bearing 113, the said bearing portion can be quite large to suit such requirements as that of having a pointer mounted thereon, yet the friction torque resulting from tension will be less, or at least no more than that which would be generated in a more conventional arrangement utilizing a uniform shaft and/or a segment centered with respect to the bearings of its shaft.

Figure 7:
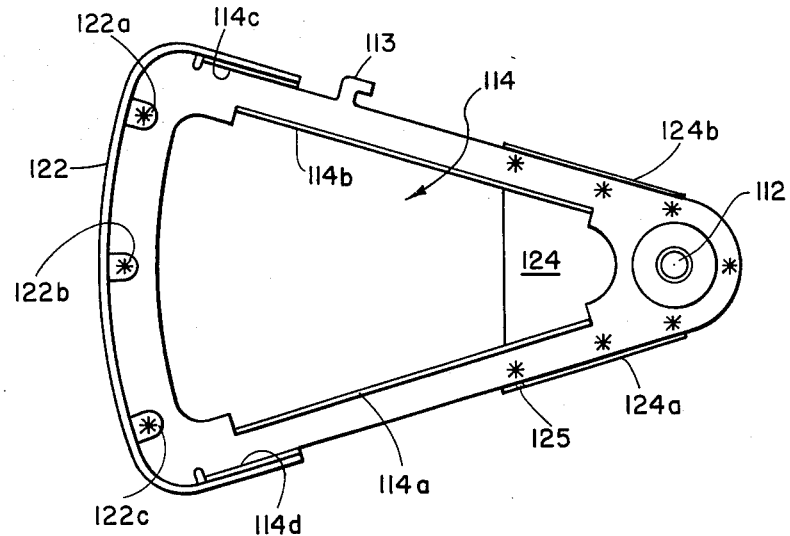
FIGURE 7 illustrates a detail of the aforesaid tape movement.

It is quite important to squeeze out the minutest improvement in frictional and other effects that would degrade performance, particularly in view of the use of the movement in accordance with FIGURE 4. As was noted previously, the parts of the tape movement are preferably built up from light-weight sheet material. Thus, as shown in FIGURE 7, segment 115 is an open cup or drum 115, and sector 114 is a simple lamina having stiffening webs 114a and 114b and a curved shoe 122 spot welded thereon. This construction, of course, minimizes inertia, and contributes to obtaining a suitably high resonant frequency. The construction also solves the difficult manufacturing problem of providing a sector having a perfectly cylindrical tape-receiving surface adjacent the segment 115. Specifically, it is easy to stamp out the sector having both integral webs and a practically perfectly circular edge at the place where it is joined to the shoe. It is then found that a flat strip of sheet material can be juxtaposed to the said edge and held to its circular conformation in a jig of some sort. If the said strip is spot welded to the edge of sector 114, say at tabs 122a, 122b, 114c and 114d, while being held in the said jig, shoe 122 is the result and has as nearly as perfect a cylindrical curvature as could be expected from machining the entire sector out of one piece of stock. Tabs 122a, b and c are struck out of shoe 122, and tabs 114c and d are struck up from the plane of sector 114 like the webs 114a and b.

To complete the sector, a plate 124 having webs 124a and 124b clasping the vertex end of the sector is welded to the sector. Inspection of FIGURE 7 will make it readily apparent that the several webs and tabs, and the said plate and shoe cooperate to make the overall sector a rigid yet light structure. Shaft 111 is integrally secured to the sector 114 by any convenient means, and a hole 125, corresponding to that through ear 121 (FIGURE 6) is provided in web 124a.

Exaggerating the length of shaft 112, allows bearing 113 to be relatively far-removed from segment 115, which mounts the pointer, thus allowing the segment end of the shaft 112 to shift in slot 123, without causing the pointer to be tilted too much toward the scale plate indicated fragmentarily at 73a (FIGURE 6). Such tilting, even if short of causing the pointer to strike the scale plate, detracts from the appearance of the instrument and can cause errors of observation of pointer position with respect to the scale.

It will be noted that tape movement is essentially sealed in a casing including base 104, and a cover plate 104b, said base having a flanged portion 104a providing an upstanding wall surrounding the tape movement and the cover plate 104b. The usual practice is to house a gauge movement, or the like, only insofar as the remainder of the mechanism in which it is found is housed. However, the tape movement according to the invention is pre-calibrated, so to speak, and once assembled, needs no attention short of becoming defective, the chances of which are minimized because the casing of the movement is so proportioned as to prevent sector from movement to great enough extent to overstress the tapes or to distort or bend the drum-like segment 115.

The casing 1, clamp 61, pivot 70, pivot 77, staff 74, and base 104 are normally supported in fixed position with respect to each other within some sort of housing, designated by the reference character H and shown in dashed line in FIGURES 3, 4 and 6, which encases the enumerated parts and their fellows.

All the adjustment of an overall instrument, as that shown in FIGURE 3 is done outside the tape movement, hence there is no point in exposing the movement at all in the field. In service, therefore, the movement can be expected to function faultlessly even in the presence of dust, moisture, or other deleterious airborne matters, and more or less proof against tampering or mishap of various sorts.

Nipple 109 and shaft 112 extend somewhat further to the right in FIGURE 6 than shown (as is suggested by the break in the showing of the said shaft and nipple in FIGURE 6). The end of nipple 109 provides a useful means for centering the scale 73, and, if desired, a circular ledge 109A may be provided upon which to rest the scale plate. To this end, scale plate 73a, shown partly in section is provided with a hole centered on the scale 73 and sufficiently large to slip over the extreme right end of nipple 109, either so that the plate 73a rests on the ledge 109a, or, in the absence of such ledge, so that the plate rests against suitable posts, or the like (not shown). Any suitable means, not shown, can be provided for fixing scale plate against rotation about the axis of the shaft 112.

Other novel features of the invention relate to compensating the effects of temperature upon the various mechanisms involved. The main temperature effects have to do with thermally-caused changes in dimension and in elastic properties. While dimensional changes, due to use of materials having definite temperature coefficients of linear expansion, may be considerably nullified by properly proportioned differential expansion effects obtainable by judicious choice of materials for the several elements of the transmitter, or, in theory, by using a bimetallic element to introduce into the mechanism a motion, or force, counter to the net increment of motion, or force, created by the effect of temperature on the overall mechanism, or by like treatment of each of the several sub-combinations making up, say, the transmitter of FIGURE 3, in practice, these expedients do not usually work out nearly so well as conceived.

Quite surprisingly, the entire mechanism of FIGURE 3 can be thoroughly compensated for dimensional changes due to temperature by making the baffle a bimetallic member which, as is shown in more detail in FIGURES 8 and 9, is in the form of a baffle 180, consisting mainly of two uniform laminae 180a and 180b, one of said laminae being made of a metal having a temperature coefficient of expansion of one value and the other of said laminae having a temperature coefficient of expansion differing in value from said one value. Assuming baffle 180 to be straight, as shown, at some temperaure, an increase or decrease in temperature will cause the baffle to assume a curved shape, whereby its end experiences a net vertical displacement, due only to temperature change, in one sense or another. The particular sense and magnitude of such displacement for a temperature change of a given sense and magnitude, of course, is chosen to be equal in magnitude opposite in sense to the net effect on baffle-nozzle spacing, of all the dimensional changes in the remainder of the instrument, consequent upon the last said temperature change.

As shown in FIGURES 8 and 9, baffle 180 is secured, as by spot welds, to a carrier 182 having a pair of ears 181 for pivotally mounting the carrier for deflection thereof. Carrier 182 is provided with a pad 183 which, as shown in FIGURE 8, is considerably wider than the baffle 180 and lies somewhat below the level of the baffle and parallel thereto. Such proportioning of baffle and carrier provides for arranging the baffle so that its plane of deflection is at right angles to the plane of FIGURE 3 and contains the vertical center line of servo-relay S, without having to make the baffle 180 unduly wide to assure that baffle actuator 71 strikes the baffle under surface. The ninety-degree orientation change is simply an expedient for reducing the lateral dimension of the overall mechanism from the point of view of FIGURES 3 and 4. If the bimetallic baffle were widened to the extent required by the shift in baffle orientation, there would arise calibration difficulties, since a relatively wide bimetallic strip does not distort uniformly from point to point across its width. Hence, by providing a separate carrier for the baffle, the motions of baffle detector 71 can be applied to the carrier and the baffle dimensions can be reduced sufficiently that the distorting effect of temperature thereon is relatively uniform, insofar as baffle-nozzle spacing change is concerned, and does not enter directly into the relation between baffle actuator deflection and baffle deflection.

Insofar as can be determined, the compensating effect of the bimetallic baffle is perfect or, at least, prevails until temperature extremes are reached such that temperature effects occur that simply could not be compensated for anyway by the substantially linear response of the bimetallic baffle (i.e., linear insofar as change in effective baffle-nozzle spacing is concerned).

A result such as the foregoing is beyond reasonable expectation and insofar as we are aware, a bimetallic baffle is novel as a compensating element. Furthermore, choice of a bimetallic baffle is particularly felicitous, since as a rule, such a compensating element is in general an additional element adding weight and mechanical complexity to the mechanism in which it is used. It is obvious that it is much simpler to provide a bimetallic element in the form of baffle 80 or 180, rather than as a variable element of the linkage between tube 60 and baffle lifter 71. The baffle can, of course, be made of very light material, since it is unloaded except for its weight and the practically nominal tension in light spring 84. Lightness is important in general here, since it helps in attaining a high resonant frequency insofar as vibration is concerned, and quick response, which are important considerations in the industrial usage contemplated for the instrument of FIGURE 3.

Over and above dimensional effects, elastic effects due to temperature must be considered. For example, a bronze or brass tube, in terms of deflection of its closed end, is more sensitive to a given pressure change at high temperatures than at low temperatures. In other words, as a spring, such a tube becomes less stiff as its temperature increases, and it is found that the temperature error, due to this effect increases not only in proportion to temperature increase, but also in proportion to the tube's deflection from its unstressed state. Conversely, Bourdon tube materials are know which have moduli of elasticity that are constant with respect to temperature, so-called NiSpan C, a nickel-steel of well-known type.

However, the servo-relay has also a spring constant due to use of elements that may also have temperature-dependent stiffness characteristics. In this instance, the servo-relay, as shown in FIGURE 1, has five spring elements (seven if it is desired to count baffle spring 81 and the supposedly-slack diaphragm 18).

In practice, however, it is found, insofar as performance is concerned, that tube 60 and range spring 34 are practically the sole critical elements insofar as error due to temperature-induced changes in stiffness are concerned. Specifically, if spring 34 has an appreciably temperature-dependent modulus of elasticity, this will be reflected in both the output pressure of the relay and the motion of stem 23.

According to the invention, errors due to temperature-dependent stiffness of spring elements are compensated for by making the stiffness error of spring 34 exactly equal to that of tube 60. This means that if tube 60 is a bronze tube, spring 34 is made of bronze too, or of a material that has a temperature coefficient of elastic modulus as nearly as possible the same as that of bronze. Again, both spring 34 and tube 60 may be made of NiSpan C, or other material having a temperature coefficient of stiffness the value of which is nearly zero.

The foregoing expedient of compensation makes the pressure output of the servo-relay independent of temperature-indicated changes in stiffness.

If, for example, the temperature increases, and the tube 60 and spring 34 have bronze-type stiffness characteristics with respect to temperature, a given pressure change in tube 60 will result in greater deflection of baffle 80 at higher temperatures than it would at lower temperatures.

On the other hand, spring 34 becomes less stiff and the force created by compressing it a given amount decreases as its temperature increases, with the result that a given movement of step 23 causes a smaller change in servo-relay output pressure at higher temperatures than at lower temperatures. Since Bourdon tube 60 causes a greater deflection of baffle 80 at higher temperatures than at lower temperatures, a correspondingly greater movement of stem 23 results and makes up for the effect of spring stiffness, due to temperature, on servo-relay output pressure.

The fact that the regulator action of the servo-relay involves a force-balance of the thrust of spring 34, prevents stiffness change in the bellows 31 and centering spring 52 from affecting the mutual compensation effect of spring 34 and tube 60.

It is necessary to provide various adjustments among the moving parts of the transmitters shown in FIGURES 3 and 4. As pointed out before, no adjustments are made within the tape movement. Again, once the various springs have been chosen, it is not necessary to be concerned with adjusting the pressure regulator elements of the relay, since this is a force-balance affair which, in effect, involves no motion. It remains, however, to correlate the motions of Bourdon tube 60, or whatever condition sensitive element be provided as the source of motion for the transmitting mechanism, the motions of stem 23, the output pressure in chamber 4 and the indications on scale 72.

Referring to FIGURES 3 and 4, it will be noted that the arm 63 has a yoke portion 63a and an arcuately-slotted portion 63c, the arc of the slot in the portion 63c running in the direction of movement of plate 64, and a pair of screws 64a being provided to fix the slotted portion to plate 64.

Yoke portion 63a is provided with a screw 63b having a block 63d threaded thereon. Screw 63b lies approximately along a radius of the tube 60 and is mounted in yoke portion 63a in such fashion as to rotate in place without motion along said radius. Pivot 65, suitably in the form of a pin, is fixed to block 63d and, hence, may be adjusted radially of the center of tube motion, by turning screw 63b. Link 66 is provided with a plurality of holes, several being denoted by the reference numeral 65a, by way of example; one of which holes receives pivot 65, any suitable means being provided to maintain operative connection between pivot and hole. Link 66 therefore prevents block 63d from rotating with screw 63b, hence, turning screw 63b moves block 63d axially of screw 63b.

At the other end of link 66, a pin and hole pivot construction is also provided, there being provided a plurality of holes in a lever arm 69, including holes 68 and 68a, by way of example, one or another of which plurality of holes receives a suitable pin in the upper end of link 66.

Further adjustment is provided by constructing lever 67 in the form of two effective arms which may be adjusted angularly with respect to each other relative to a common axis of deflection. Thus, the arm 69 of lever 67 terminates in a yoke 69a having a screw 69b mounted thereon and pivoted on pivot 70. The other arm of lever 67 consists of baffle actuator 71, a yoke 71a having a screw 71b (FIGURE 4, only) mounted thereon, and a toothed sector 71c fixed to yoke 71a and pivoted on pivot 70.

Yoke 69a and screw 69b are constructed and arranged to coact with the sector 71c, somewhat after the fashion of yoke 63a and screw 63b with block 63d, i.e., if screw 69b is turned, it rotates in place in yoke 69a, whereby one of sector 71c and arm 69 deflects with respect to the other about pivot 70.

Baffle and nozzle adjustment is provided for, respectively, in nozzle 79 and collar 85. The former may be screwed in or out of the end of stem 23 to various positions, and the latter may be moved to various positions along the stem and fixed in place by means of set screw 85a.

All the foregoing adjustment structure is common to the species of FIGURES 3 and 4 (although not shown in the fragmentary view of FIGURE 4), except that in the case of FIGURE 3, no provision is made for shifting baffle actuator 71 laterally of yoke 71a. However, in FIGURE 3, collar 86 is provided with a yoke 87a, screw 87b and a block 87, said yoke, screw and block cooperating like yoke 63a, screw 63b and block 63d of arm 63.

In calibrating the species of FIGURE 3, at 50% of the range of pressure to which tube 60 is to be subjected, the pressure output of the servo-relay S should be at the 50% point, the pointer 72 should stand at 50% of scale on scale 73, and the sector 76 should be approximately half-way between the limits of its travel. In this state, a straight line joining the center of curvature of the upper end of actuator 71, which upper end may be spherical, with the axis of pivot 70, should be normal to the center line of nozzle tube 23, i.e., the axis of pivot 70 and the center of curvature of the said upper end will be in a plane normal to the movement of stem 23.

This arrangement minimizes angularity effects that otherwise would occur because the follow-up action of stem 23 is linear, whereas the said baffle and lever deflect about axes. That is, the opening of nozzle 79 and the next adjacent surface of baffle 80 represents parallel planes, maintained in parallelism by linear follow-up motion of stem 23, whereas actuator 71 moves in a circular path.

As is evident, the foregoing conditions can be met by proper adjustment of collars 85 and 86 on stem 23, of the angle between the effective lever arm of baffle actuator 71 and arm 69, and of the pointer 72 with respect to its staff 74 (no particular adjusting means for this shown as this is a conventional feature of indicating mechanisms).

Adjustment of pin 88 by means of screw 87b suffices to make the 0% and 100% readings of pointer 72 coincide with the limits of the pressure output range of the servo-relay S, independently of the motion input to the baffle via lever 67. Note that, with respect to motion of stem 23, the axis of shaft 77 and the center line of pin 88 should intersect the same normal to stem 23, at mid-range of the instrument. If desired, the locations of pin 88 and slot 89 may be interchanged, in order to prevent side play in stem 23 from altering the effective radius of arm 78.

As to the tube 60, its span adjustment is roughly given by appropriate choice of holes 68a for pin 68 and refined by turning screw 63b to move block 63d.

Likewise, linearity is taken care of approximately by means of the slotted portion 63c of arm 63, since for a given lot of tubes similar as to range and sensitivity, the decrease in sensitivity of the tube to pressure change as it is distorted by pressure is approximately uniform.

Hence, the arm 63 can be shifted angularly to where the angle between it and arm 69 is approximately correct, screws 64a being the meansf or holding arm 63 in adjusted position. A fine adjustment for linearity comes about by choosing an appropriate hole 65a and operating screw 69b to accommodate the adjustment in the length of the link 66 between the chosen hole 65a and the hole 68a receiving pin 68.

Normally, the various parts of the mechanism will be assembled in a configuration corresponding approximately to what is desired for a pressure in tube 60 corresponding to the 50% point in the range of the variable represented by said pressure. For example, with the form of tape movement shown in FIGURES 5 and 6, collar 67a can be loosened so as to permit getting the position of sector 114 approximately in correspondence to the position of lever 67. Each individual instrument, however, will have to be adjusted more exactly for zero and span of its various components.

In the case of the species of FIGURE 4, the screw 71b is used to adjust the output pressure span of the servo-relay S to the scale span of the pointer 72.

The foregoing description of the nature of the several adjustments will suffice to enable one skilled in the art to calibrate transmitters in accordance with my invention. It is therefore unnecessary to go into a suitable schedule of adjustments other than to state that the procedure should be serial, i.e., first, zero the instrument, then adjust its span, then adjust it for linearity, and cumulative, i.e., adjusting its span may require re-zeroing, which in turn may require the span to be readjusted, and so on, until zero and span are correct, at which time the linearity adjustment may be made. After this, it may be necessary to recapitulate the zero and span adjustments, which may result in a need to re-adjust for linearity and so on, until, after a satisfactory linearity adjustment, a check for zero and span shows that both these adjustments need no further attention as a result of the last linearity correction.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:

1. In combination, pressure regulator means for producing a fluid pressure proportional to a force exerted on said pressure regulator, first spring means for exerting said force, said first spring means being deformable to exert said force in proportion to its deformation; servomotor means having a part movable for deforming said first said spring means in proportion to motion of said part, said servomotor having motion-detecting means including a pair of elements, said elements being movable with respect to one another to cause said servomotor to move its said part; condition responsive means having a member movable in proportion to the magnitude of said condition, said member being connected to one of said elements for moving same, means connecting said other element to said part of said servomotor for motion of said other element, said servomotor being constructed and arranged so that motion of the said one element in one sense causes said servomotor to move said part in a manner such as to move the said other element in the opposite sense, motion transmitting means connected to said part for transmitting to utilization means a motion representing motions of said part; and said condition responsive means including second spring means, whereby change in said condition causes a change in the fluid pressure produced by said pressure regulator and a quantity of motion to be transmitted by said motion transmitting means to said utilization means, said change in fluid pressure and said quantity of motion being equivalent to each other and to said change in condition; each said spring means being alike insofar as the effect of temperature on said effective stiffnesses is concerned.

2. The invention of claim 1, wherein said first and second spring means are respectively first and second metallic springs, said springs being alike insofar as the effect of temperature on their stiffness is concerned.

3. A gauge pressure transmitter, said transmitter including, in combination, a low-energy condition responsive device having a part movable in response to a variable condition; a servo-relay, said servo-relay including a force-balance fluid pressure-regulator type of relay having a member movable in response to force exerted thereon to create a fluid pressure having a magnitude proportional to said force, a pressure servomotor having an actuator movable with a long, powerful stroke in response to pressure applied to said servomotor, said pressure-regulator type of relay and said servomotor being so constructed and arranged that the pressure created by the former does not affect the position of said actuator, and said servomotor being so constructed and arranged that said stroke is in length proportional to the magnitude of said pressure applied to said servomotor; a spring connecting said actuator to said member for conversion of said stroke into a force on said member in proportion to the length of said stroke; a nozzle element and a baffle element for controlling said pressure applied to said servomotor, said elements being constructed and arranged for relative displacement toward and away from each to change said pressure applied to said servomotor in respectively one and the other of the two senses: increase and decrease; means connecting one of said elements to said condition responsive device for causing said relative displacement between said elements in accordance with variations in said condition whereby said actuator moves in a sense corresponding to the resulting change in said pressure applied to said servomotor, and means connecting said actuator to the other of said elements for causing relative displacement of the latter in a sense opposite to sense of relative displacement of said one of said elements causing the said resulting change in said pressure applied to said servomotor, said pressure regulator type of a relay including a fluid-pressure controlled valve means having a cylindrical bellows arranged to balance the force of said spring against a force due to the fluid pressure created by said relay, there being a valve means controlling elongated member connected to said bellows and lying within the interior thereof along the cylinder axis of said bellows; a partition closing off the open end of said bellows and having an aperture therein through which said elongated member extends externally of the interior of said bellows; a damping washer slidably mounted on said elongated member and spring means biasing said washer along said elongated member toward said partition and there being spring means resiliently maintaining said elongated member in a predetermined position with respect to the periphery of said aperture, said washer having a flat-face thereon facing said aperture, said flat-face being of sufficient extent to more than cover said aperture, and the next-adjacent surface of said partition being flat continuously around the periphery of said aperture, the arrangement being that the first said spring means normally forces the said washer up against said partition with its said flat face flush against the flat part of said surface of said partition; said washer having a clearance about said elongated member, which clearance is proportioned to the effective volume in the interior of said bellows in such amount as to damp flow of fluid under pressure in and out of said bellows as said regulated pressure increases and decreases, said valve means being located outside of the interior of said bellows, and said elongated member providing for venting fluid under pressure from a place in said relay also outside of the said bellows.

4. A gauge pressure transmitter, said transmitter including, in combination, a low-energy condition responsive device having a part movable in response to a variable condition; a servo-relay, said servo-relay including a force-balance fluid pressure-regulator type of relay having a member movable in response to force exerted thereon to create a fluid pressure having a magnitude proportional to said force, a pressure servomotor having an actuator movable with a long, powerful stroke in response to pressure applied to said servomotor, said pressure-regulator type of relay and said servomotor being so constructed and arranged that the pressure created by the former does not affect the position of said actuator, and said servomotor being so constructed and arranged that said stroke is in length proportional to the magnitude of said pressure applied to said servomotor; a spring connecting said actuator to said member for conversion of said stroke into a force on said member in proportion to the length of said stroke; a nozzle element and a baffle element for controlling said pressure applied to said servomotor, said elements being constructed and arranged for relative displacement toward and away from each to change said pressure applied to said servomotor in respectively one and the other of the two senses: increase and decrease; means connecting one of said elements to said condition responsive device for causing said relative displacement between said elements in accordance with variations in said condition whereby said actuator moves in a sense corresponding to the resulting change in said pressure applied to said servomotor, and means connecting said actuator to the other of said elements for causing relative displacement of the latter in a sense opposite to sense of relative displacement of said one of said elements causing the said resulting change in said pressure applied to said servomotor, said condition responsive device being in the nature of a spring incorporating said part and having a modulus of elasticity such that motion of said part in response to a given change in said condition is a function of said modulus of elasticity; the first said spring and the second said spring being so chosen as to be quantitatively like in relation to the effect of like changes in temperatures experienced by said springs.

5. A gauge pressure transmitter, said transmitter including, in combination, a low-energy condition responsive device having a part movable in response to a variable condition; a servo-relay, said servo-relay including a force-balance fluid pressure-regulator type of relay having a member movable in response to force exerted thereon to create a fluid pressure having a magnitude proportional to said force, a pressure servomotor having an actuator movable with a long, powerful stroke in response to pressure applied to said servomotor, said pressure-regulator type of relay and said servomotor being so constructed and arranged that the pressure created by the former does not affect the position of said actuator, and said servomotor being so constructed and arranged that said stroke is in length proportional to the magnitude of said pressure applied to said servomotor; a spring connecting said actuator to said member for conversion of said stroke into a force on said member in proportion to the length of said stroke; a nozzle element and a baffle element for controlling said pressure applied to said servomotor, said elements being constructed and arranged for relative displacement toward and away from each to change said pressure applied to said servomotor in respectively one and the other of the two senses: increase and decrease; means connecting one of said elements to said condition responsive device for causing said relative displacement between said elements in accordance with variations in said condition whereby said actuator moves in a sense corresponding to the resulting change in said pressure applied to said servomotor, and means connecting said actuator to the other of said elements for causing relative displacement of the latter in a sense opposite to sense of relative displacement of said one of said elements causing the said resulting change in said pressure applied to said servomotor, said baffle element being a bimetallic member pivoted at one end thereof for deflection in an arc in consequence of motions of said part, the bimetallic arrangement of said bimetallic member being such that the other end thereof deflects substantially in the same arc in proportion to the temperature of said member, and also being such that the sense and amount of deflection of said other end, in response to temperature alone is equal and opposite to the effect of thermal expansion of the other structure of said transmitter, to the extent that the said effect creates a change in the distance between said baffle element and said nozzle element.

6. In combination, a cylindrical casing open at both ends; a first partition closing one end of said casing, a second partition closing the other end of said casing, and a third partition across the intermediate portion of said casing, long-stroke diaphragm means in said casing and next adjacent said first partition, said long-stroke diaphragm means being circular and sealed at its periphery around the periphery of said casing so as to define a first pressure chamber between said first partition and said long-stroke diaphragm means; said first partition having an aperture therein centered on the cylinder axis of said casing; an elongated straight stem having one end fixed to the center of said long-stroke diaphragm means, the intermediate portion thereof extending through the aperture in said first partition, and its other end extending outside said casing and located on said cylinder axis; sealing means in the last said aperture for permitting motion of said stem axially of said casing while preventing passage of fluid through said aperture and around said stem; said third partition having an aperture therein centered on the cylinder axis of said casing; further diaphragm means, said further diaphragm means being circular, and being secured around its periphery to said third partition for closing off said aperture in said third partition, whereby to define a second pressure chamber between said second partition and said further diaphragm means; vent means having a bore open at both ends, said vent means being mounted on said further diaphragm means and arranged so that one end of its said bore communicates with the space between the two said diaphragm means, and so that the other end of its said bore communicates with said second pressure chamber; fluid supply means having a bore, said fluid supply means being mounted on said second partition and arranged so that its said bore communicates at one end thereof with said second pressure chamber, said fluid supply means having its said bore adapted for connection to a supply of fluid under pressure for supplying said fluid to said second pressure chamber, via said end of its said bore; movable valve means located in said second pressure chamber; said valve means having a first portion located adjacent the said end of the said bore in said fluid supply means, and said valve means having a second portion adjacent the second said end of the bore of said vent means; said valve means being so constructed and arranged that a force on said further diaphragm means directed toward said second partition moves said valve means so as to cause one of its said portions to seal the bore end adjacent thereto and so as to cause the other of its said portions to unseal the bore end adjacent thereto, and vice versa, if said force is reversed in direction; spring means having two end parts, said spring means being constructed and arranged so that if one of said end parts is fixed and force is applied to the other said end part in a direction such as to cause the distance between said end parts to change, said spring means stores up energy in proportion to the change in said distance; said spring means having one of said end parts connected to said long-stroke diaphragm means and the other of said end parts is connected to said further diaphragm means, the arrangement being that the motions of the central parts of both said diaphragm means toward and away from each other, along the cylindrical axis of said casing, create said change in distance when motion of the central part of one of said diaphragm means is different from motion of the central part of the other of said diaphragm means; further fluid supply means having a bore, its said bore having one end thereof communicating with said first pressure chamber, and said further fluid supply means having its said bore adapted to be connected to a source of fluid under pressure for supplying said fluid to said first pressure chamber, via its said bore; further vent means having a bore, said vent means having its said bore in communication with said first pressure chamber, and said vent means having one end of its bore open to the space external to said casing; control means movable in each of two opposed directions, said control means being constructed and arranged such that movement thereof in one of said opposed directions impedes flow of fluid out of the said end of the said bore of said further fluid vent means, and, if impeding such flow, such that movement thereof in the other of said opposed directions causes said flow to be impeded less.

7. The invention of claim 6, wherein said further vent means is effectively fixed to said first partition.

8. The invention of claim 6, wherein said further vent means is incorporated in said stem, and said control means is arranged so that motions of said stem along the said cylindrical axis of said casing are tantamount to movement of said control means in said opposed directions.

9. The invention of claim 6, including further spring means like the first said spring means, save that one end part of said further spring means is effectively connected to said third partition.

10. The invention of claim 6, wherein said further diaphragm means is a cylindrical bellows having an open end and a closed end and being compressible and expandible along its cylindrical axis, said open end being sealed to said third partition around the said aperture therein, said bellows being coaxial with said casing; a cylindrical nipple having a bore, said nipple having one end integrally fixed to said third partition, being coaxial with said bellows, extending into said bellows and having its said bore in communication with the last said aperture and with the interior of said bellows; the first said vent means being in the form of a cylindrical tube open at both ends, said tube being coaxially mounted on the said closed end of said bellows and having one end opening into the space outside said bellows; said tube extending through the said bore of said nipple and through said aperture into the space between said second and third partitions and having its other end spaced from the said third partition along the cylinder axis of said casing; said tube being elastically restrained from motion transverse to said cylindrical axis; a damping washer having a flat-face, being slidably mounted on said tube, and having the said flat-face facing said third partition; the inner diameter of said washer and the outer diameter of said tube being chosen to define an annular restriction between said tube and said washer, said annular restriction being of proportions suited to the fluid-containing volume inside said bellows and between the said closed end of said bellows and said washer; elastic means biasing said washer into contact with the next adjacent surface of the said third partition and around the said aperture therein, said next adjacent surface being flat for sufficient extent to permit the said flat-face of said washer to fit sealingly thereto continuously around the periphery of the last said aperture, both said flat surface and said flat-face being of sufficient extent such that said tube can shift transversely, without exposing any of the periphery of the last said aperture.

11. The invention of claim 6, wherein the first said fluid supply means is the form of a nipple having a bore therethrough, said nipple being mounted on said second partition, with one end of its said bore communicating with the space external to said casing, and the other end of its said bore opening into the space between said second and third partitions, the said ends of the said bore of said nipple being constructed as valve seats with respect to a suitable member located in said bore of said nipple between the said ends of the said bore of said nipple; the said valve means being in the form of a valve stem having three valve members spaced serially along said valve stem, the intermediate one and another of said valve members being located in said bore of said nipple, and said valve stem having one end thereof extending out of said bore into the space between said first and second partition and adjacent the second said end of the said bore of the first said vent means, the last of said valve members being positioned at said one end of said valve stem adjacent said second said end of the said bore of the first said vent means; a balancing tube in said bore, said balancing tube having one end in the form of a valve member adapted to coact as such with the said one end of the said bore of said nipple, said tube also having a bore open at both ends, the other end of said valve stem extending through one end of the said bore of said tube into the last said bore; the said another of said valve members being positioned on the said other end of said valve stem and being shaped so as to be slidable along the bore of the said tube while fitting the cross-section of the bore of the said tube; said intermediate valve member being constructed and arranged to seat in the said other end of the said bore of said nipple; said tube, said nipple, the first said vent means and said valve stem being so positioned and proportioned that movement of said further diaphragm means toward said third partition seats said last of said valve members in the next adjacent end of the bore of said first said vent means, unseats said intermediate one of said valve members from the other end of said bore of said nipple, and causes said another of said valve members to slide along the said bore of said tube; said bore of said tube opening through the said valve member thereof, via an aperture in the last said valve member, the said aperture being of lesser proportions than the said bore of said nipple where it seats the said last said valve member, said bore also opening externally of said space between said second and third partitions, and between the said ends of said tube, for connecting said bore of said tube to a source of fluid under pressure.

12. A balanced valve for a pressure regulator including a fluid vent member and a fluid supply member, one of said members being movable toward and away from the other, and each of said members having a flow passage therethrough; said valve including an elongated stem having a first plug, a second plug and a third plug serially arranged thereon in the order named, said stem extending between said flow passages and having the said first plug positioned to obscure one of said flow passages and the said second plug arranged to obscure the other of said flow passages, a tube having a flow passage, the said tube being arranged to have its flow passage communicate at one end of the tube with the said flow passage of said fluid supply member, the said flow passage of said tube also being arranged to communicate at the other end of said tube with the said flow passage of said fluid vent member; said third plug being positioned within the said flow passage of said tube and between the said ends of said tube; said plugs, members and tube being so constructed and aligned that movement of said members toward each other causes said first plug to obstruct the said flow passage of said fluid vent member, whereas movement of said members away from each other causes said second plug to obstruct flow through said flow passage of said fluid vent member; said first and second plugs otherwise permitting free flow of fluid through the corresponding said flow passages; said third plug and said tube being constructed and arranged that said third plug continually obstructs flow through the said flow passage of said tube while being freely movable therein, and means for supplying fluid under pressure to the said flow passage of said fluid supply member and between said second an third plugs.

13. The invention of claim 12, wherein said tube is movable with respect to said fluid supply member.

14. The invention of claim 12, wherein said tube is bodily-movably positioned within the said flow passage of said fluid supply member, the last said flow passage having a communicating passage communicating with the said flow passage of said fluid vent member, and said tube includes valve means obstructing the said communicating passage.

15. In a pressure regulator of the type having a pressure-responsive, expansible and contractible chamber, valve means responsive to volumetric change of said chamber, due to contractions and expansions of said chamber, to connect said chamber to one or the other of a source of fluid under pressure and a lower pressure region, a partition having an aperture therethrough, said aperture defining a fluid flow passageway connecting said chamber to either of said regions and said source, depending on said valve means' response to said volumetric change, and a stem interconnecting said chamber and said valve means for moving the latter in response to said volumetric changes, said stem passing through said aperture and being arranged to move axially in said aperture, whereby to define a substantially annular flow passage around said stem where it passes through said aperture, the improvement comprising an annular member surrounding said stem and movable axially of said stem; spring means biasing said annular member into contact with said partition around said aperture, said member and said partition being formed to sealingly fit together all the way around said aperture, and said member and said stem being dimensioned so that there is a clearance between said stem and said member, said clearance defining a fluid flow restriction having a desired restricting effect on flow of fluid therethrough.

16. A fluid flow restrictor, comprising a partition having an aperture therethrough, a stem passing through said aperture, said stem being mounted for movement axially of said aperture, an annular member surrounding said stem, there being sufficient clearance between said stem and said annular member to define a flow restriction of desired size; spring means arranged to bias said annular member against said partition, and said stem being cylindrical; said partition having a smooth uniform flat surface extending all the way around said aperture, and said annular member having a smooth uniform flat surface parallel to and facing the first said surface, and extending all the way around said stem, both said surfaces being oriented so that said spring means biases said partition and said annular member into sealing contact with each other at their said uniform flat surfaces.

17. An adjustable baffle and nozzle follow-up mechanism, including a stem, a nozzle, and a pressure responsive expansible chamber for moving said stem in response to pressure admitted to said chamber, said nozzle being mounted on said stem, a baffle support mounted on said stem, said support being movable to different fixed positions on said stem and along the direction of movement of said stem, pivot means carried by said support and positioned to one side of the path followed by said nozzle when moved by said stem, a baffle, said baffle having a first portion connected to said pivot means and a second portion extending across the path of said nozzle, said pivot means being constructed and arranged to permit angular deflection of said second portion about an axis defined by said pivot means and both toward and away from said nozzle, said nozzle opening in the direction of said second portion, and said second portion being constructed and arranged to throttle flow of fluid through said nozzle if deflected to within a predetermined distance from said nozzle; said nozzle being adjustable on said stem to different fixed positions along its said path of movement.

18. The invention of claim 17, including a collar on said stem, said collar being slidable along the length of said stem, and clamping means for fixing said collar to a selected position along the length of said stem, said collar means being said baffle support.

19. In a servo device including a long-stroke pressure-operated motor having a chamber and a member, wherein said member is movable in a straight line in response to force due to admission of fluid pressure to said chamber, and including means for admitting fluid under pressure to said chamber, a nozzle connected to said chamber for allowing fluid under pressure to escape from said chamber; a baffle for throttling flow of fluid out of said nozzle, said nozzle being effectively part of said member and opening in the direction of said line, said baffle being pivoted on said member and extending in front of said nozzle, the arrangement being that said baffle is pivotable toward and away from said nozzle to respectively obstruct and freely permit free flow of fluid from said nozzle; means biasing the said member along said line in the direction of said baffle, said bias means being constructed and arranged such that if fluid pressure be admitted to said chamber, and said nozzle be throttled, said member will move in the direction opposite to the last said direction; a baffle actuator and a lever, said actuator being fixed to one part of said lever and said lever being pivoted to a fixed point for angular movement of said actuator in a plane containing said line, condition responsive means moving said lever to angular positions representative of said condition, said baffle having a plane-surfaced portion extending across the path of said actuator and said portion being in contact with said actuator, said actuator having a spherical surface next adjacent said plane-surfaced portion and tangent thereto, said lever, said baffle, said actuator and said member being so proportioned and oriented that the center of curvature of said spherical surface and the pivot axis of said lever both lie in a plane normal to said straight line for one value of said condition, said nozzle being positioned at just sufficient distance from said baffle that said baffle allows just enough fluid to escape from said nozzle that the said bias means prevents motion of said member away from said baffle, whereas the force on said member due to fluid pressure in said chamber is sufficient to prevent said bias means from moving said member toward said baffle.

(References on following page)

References Cited by the Examiner

UNITED STATES PATENTS

| | | | |
|---|---|---|---|
| 2,212,085 | 8/1940 | Tate | 73—90 |
| 2,307,248 | 1/1943 | Ullman et al. | 74—96 |
| 2,350,261 | 5/1944 | Tate | 73—90 |
| 2,433,577 | 12/1947 | Poole | 73—209 |
| 2,456,211 | 12/1948 | Nardone | 121—38 |
| 2,542,167 | 2/1951 | Teague | 121—38 |
| 2,631,570 | 4/1953 | Bowditch | 137—557 X |
| 2,718,896 | 9/1955 | Jones | 137—85 |
| 2,811,047 | 10/1957 | Christoph | 74—96 |
| 2,821,952 | 2/1958 | Inghan | 116—129 |
| 2,911,991 | 11/1959 | Pearl | 137—85 |
| 2,925,734 | 2/1960 | Gorgens | 73—418 X |
| 2,930,235 | 3/1960 | Oppenheim | 73—411 |
| 2,941,498 | 6/1960 | Teter | 116—129 |
| 2,993,498 | 7/1961 | Brand | 137—85 |

FOREIGN PATENTS 393,027 6/1933 Great Britain.

LOUIS R. PRINCE, *Primary Examiner.*

RICHARD C. QUEISSER, ROBERT L. EVANS, C. I. McCLELLAND, D. O. WOODIEL,
*Assistant Examiners.*